US00RE35813E

United States Patent [19]

Usa et al.

[11] E Patent Number: Re. 35,813

[45] Reissued Date of Patent: Jun. 2, 1998

[54] TONE SIGNAL GENERATION DEVICE WITH RESONANCE TONE EFFECT

[75] Inventors: Satoshi Usa; Hideo Suzuki, both of Hamamatsu, Japan

[73] Assignee: Yamaha Corporation, Japan

[21] Appl. No.: 671,357

[22] Filed: Mar. 19, 1991

Related U.S. Patent Documents

Reissue of:

[64] Patent No.: 4,909,121
Issued: Mar. 20, 1990
Appl. No.: 252,261
Filed: Sep. 30, 1988

[30] Foreign Application Priority Data

Oct. 2, 1987 [JP] Japan ..... 62-249399
Oct. 2, 1987 [JP] Japan ..... 62-249400

[51] Int. Cl.[6] ..... G10H 1/057; G10H 7/00

[52] U.S. Cl. ..... 84/606; 84/622; 84/627; 84/DIG. 9

[58] Field of Search ..... 84/602–607, 622–633, 84/659–665, 692–711, 687–690, DIG. 1, DIG. 4, DIG. 9, DIG. 16, DIG. 19, DIG. 26, DIG. 27

[56] References Cited

U.S. PATENT DOCUMENTS

| | | | |
|---|---|---|---|
| 4,067,253 | 1/1978 | Wheelwright et al. | 84/687 |
| 4,211,141 | 7/1980 | Jensen et al. | 84/711 |
| 4,383,462 | 5/1983 | Nagai et al. . | |
| 4,391,176 | 7/1983 | Niinomi et al. | 84/662 X |
| 4,552,051 | 11/1985 | Takeuchi | 84/626 |
| 4,577,540 | 3/1986 | Yamana | 84/665 |
| 4,586,417 | 5/1986 | Kato et al. | 84/630 |
| 4,628,787 | 12/1986 | Nozawa | 84/603 |
| 4,633,749 | 1/1987 | Fujimori et al. | 84/607 |
| 4,706,537 | 11/1987 | Oguiri | 84/622 X |
| 4,726,276 | 2/1988 | Katoh et al. | 84/663 |
| 4,738,179 | 4/1988 | Suzuki | 84/604 |
| 4,779,505 | 10/1988 | Suzuki | 84/622 |

FOREIGN PATENT DOCUMENTS

| | | |
|---|---|---|
| 0167847 | 8/1985 | European Pat. Off. . |
| 60-52896 | 3/1985 | Japan . |
| 60-55398 | 3/1985 | Japan . |
| 60-68387 | 4/1985 | Japan . |
| 60-91393 | 5/1985 | Japan . |
| 60-91395 | 5/1985 | Japan . |
| 63-267999 | 11/1988 | Japan . |

*Primary Examiner*—Stanley J. Witkowski
*Attorney, Agent, or Firm*—Graham & James LLP

[57] ABSTRACT

A circuit for adding a resonance tone to a tone signal to be generated is provided. When a damper operator is not operated, the resonance tone is not added but an ordinary tone signal is generated. When the damper operator has been operated, the resonance tone is added so that a tone signal including the resonance tone is generated. An effect of a damper operator, i.e., loud pedal, in a piano, a natural musical instrument, is thereby simulated with high fidelity. The resonance tone may be produced by passing an ordinary tone signal through a filter. Alternatively, data obtained by sampling an actually produced tone of a piano, a natural musical instrument, when a damper operator, i.e., loud pedal, is ON may be stored in a memory and a resonance tone may be generated by reading out the stored data from the memory. The signal of the generated resonance tone may be sounded by itself or after mixing with an ordinary tone signal at a suitable mixing ratio. In addition to the imparting of the resonance tone, a known control for switching of a decay rate of a tone volume envelope may be performed.

24 Claims, 4 Drawing Sheets

TONE SIGNAL GENERATION DEVICE WITH RESONANCE TONE EFFECT

Matter enclosed in heavy brackets [ ] appears in the original patent but forms no part of this reissue specification; matter printed in italics indicates the additions made by reissue.

BACKGROUND OF THE INVENTION

This invention relates to a tone signal generation device suitable for simulating a damper pedal effect of a piano or the like musical instrument Known in the art of an electronic musical instrument capable of generating a tone with a piano tone color is one in which a tone of a piano in a damper pedal (loud pedal) OFF state is picked up and stored in a memory and a tone waveform thus stored in this memory is subsequently read out to generate a tone with a piano tone color.

It is know that, in this type of electronic musical instrument, the envelope of a tone which is being produced is controlled in such a manner that, when a damper pedal attached to the instrument is not ON, the tone is attenuated fast upon key-off whereas when the damper pedal is ON, the tone is attenuated gradually.

In the above described prior art electronic musical instrument, it is not possible to simulate an impression of expansion of a tone which is peculiar to a piano tone being played in a damper pedal On state. When a piano is played in the damper pedal On state in which the damper is released from strings of all piano keys, strings other than a string which has been struck by a hammer vibrate due to resonance with resulting generation of an acoustic effect which imparts the impression of expansion to the tone being played. In the prior art electronic musical instrument, however, pressing of the damper pedal into an ON state brings about change in the envelope shape of a depressed key only and fails to produce such acoustic effect of tone expansion.

SUMMARY OF THE INVENTION

It is, therefore, an object of the invention to obtain an acoustic effect imparting the impression of expansion of a tone similar to the one obtained by playing a piano in the damper pedal ON state The tone signal generation device according to the invention comprises memory means, readout means, resonance tone generation means, operator and output means.

The memory means stores waveform information corresponding to a desired tone waveform. As the waveform information, information representing a tone waveform picked up from a tone of a piano being played in a damper pedal (loud pedal) OFF state, for example, may be employed.

The readout means reads out waveform information from the memory means at a desired readout speed and the tone pitch of a generated tone is determined in accordance with this readout speed.

The resonance tone generation means generates resonance tone information in response to the read out output of waveform information and is constructed of a digital filter or the like device.

The operator may consist of a damper pedal attached to the electronic musical instrument or, alternatively, a manual operator.

The detection means detects presence or absence of operation of the operator and provides a detection output exhibiting a different value depending upon the presence or absence of the operation.

The output means provides the read out output of the waveform information as a first tone signal when the detection output from the detection means exhibits one value and delivers out the resonance tone information as a second tone signal when the detection output from the detection exhibits another value.

In such construction, one value and another value of the detection output may be used as values corresponding to the presence and absence of operation of the operator and an amplitude level of the resonance tone information in the output means may be gradually increased from start of operation of the operator.

The detection means may generate a detection output in accordance with the amount of operation of the operator while first and second level control means may be provided in lieu of the output means. In this case, the first level control means controls the level of the read out output of waveform information in one direction (e.g., decreasing direction) in accordance with increase of the amount of operation exhibited by the detection output whereas the second level control means controls the amplitude level of the resonance tone information in a direction which is opposite to the one direction (e.g., increasing direction) in accordance with increase in the amount of operation exhibited by the detection output. The outputs of the first and second level control means are delivered out as the first and second tone signals.

According to the invention, a desired tone can be generated in accordance with stored waveform information during a non-operation mode of the operator and a tone imparting the impression of expansion can be generated in accordance with resonance tone information during operation of the operator whereby the damper pedal effect of a piano or the like musical instrument can be simulated with high fidelity.

By gradually increasing the amplitude level of resonance tone information from start of the operation of the operator, the gradually increasing expansion of a tone due to resonance caused by releasing of a damper from strings of a piano occurring when the damper pedal is pressed ON in the piano can be simulated.

Further, as described above, by changing the level of the read out output of waveform information and the amplitude level of resonance tone information in opposite directions in accordance with increase in the amount of operation of the operator, the impression of expansion of a tone can be controlled as desired within an operable range of the operator.

Another tone signal generation device according to the invention comprises memory means for storing first waveform information corresponding to a waveform of a desired tone and second waveform information corresponding to a mixed waveform of the tone and a resonance tone thereof, the operator, the detection means, and tone signal generation means for generating a first tone signal in accordance with the first waveform information when the detection output exhibits one value and second tone signal in accordance with the second waveform information when the detection output exhibits another value.

As the first and second waveform information, data representing a tone waveform in a damper pedal OFF state and data representing a tone waveform in a damper pedal ON state respectively picked up from a piano, for example, may be employed.

As the tone signal generation means, there may be employed one which comprises readout means for reading out the first waveform information and the second waveform information in parallel from the memory means at a desired speed, and selection means for selecting the read out output of the first waveform information and delivering it out as the first tone signal when the operator is not operated and selecting the read out output of the second waveform information and delivering it out as the second tone signal when the operator is operated, the selection means gradually decreasing the level of the read out output of the first waveform information from start of operation of the operator while gradually increasing the level of the read out output of the second waveform information.

When the readout means is provided, the detection means may generate a detection output in accordance with an amount of operation of the operator and there may be provided first level control means for controlling the level of the read out output of the first waveform information for changing it in one direction in accordance with increase in the amount of operation exhibited by the detection output and second level control means for controlling the level of the read out output of the second waveform information for changing it in a direction which is opposite to the one direction in accordance with increase in the amount of operation exhibited by the detection output, and the outputs of the first and second level control means may be delivered out as the first and second tone signals According to the invention, a desired tone can be generated in accordance with the first waveform information when the operator is not operated while a tone including a resonance tone and thereby imparting an impression of expansion of a tone is generated in accordance with the second waveform information when the operator is operated whereby the damper pedal effect of a piano or the like musical instrument can be simulated with high fidelity.

Further, by gradually decreasing the level of the read out output of the first waveform information and gradually increasing the level of the read out output of the second waveform information from start of operation of the operator, the gradually increasing expansion of a tone due to resonance caused by releasing of a damper from strings of a piano occurring when the damper pedal is pressed ON in the piano can be simulated.

Further, as described above, by changing the level of the read out outputs of the first and second waveform information in accordance with increase in the amount of operation of the operator in opposite directions, the feeling of expanision of a tone can be controlled as desired within an operable range of the operator.

The electronic musical instrument according to the invention comprises tone pitch designation means for designating a tone pitch of a tone to be generated, tone signal generation means for generating a tone signal in accordance with the tone pitch designated by the tone pitch designation means, an operator for controlling a tone, and resonance tone adding means responsive to operation of the operator for adding a resonance tone to the tone signal to be generated by the tone signal generation means.

When the operator is operated, a resonance tone is added to a tone signal by the resonance tone adding means. A tone including a resonance tone and imparting an impression of expansion of the tone can be generated.

In this electronic musical instrument, in a known manner, envelope switching means may be further provided for switching a decay rate of amplitude envelope of the tone signal to be generated by the tone signal generation means.

With reference to the accompanying drawings, embodiments of the invention will be described.

BRIEF DESCRIPTION OF THE DRAWINGS

In the accompanying drawings.

DESCRIPTION OF PREFERRED EMBODIMENTS

Figure 1:
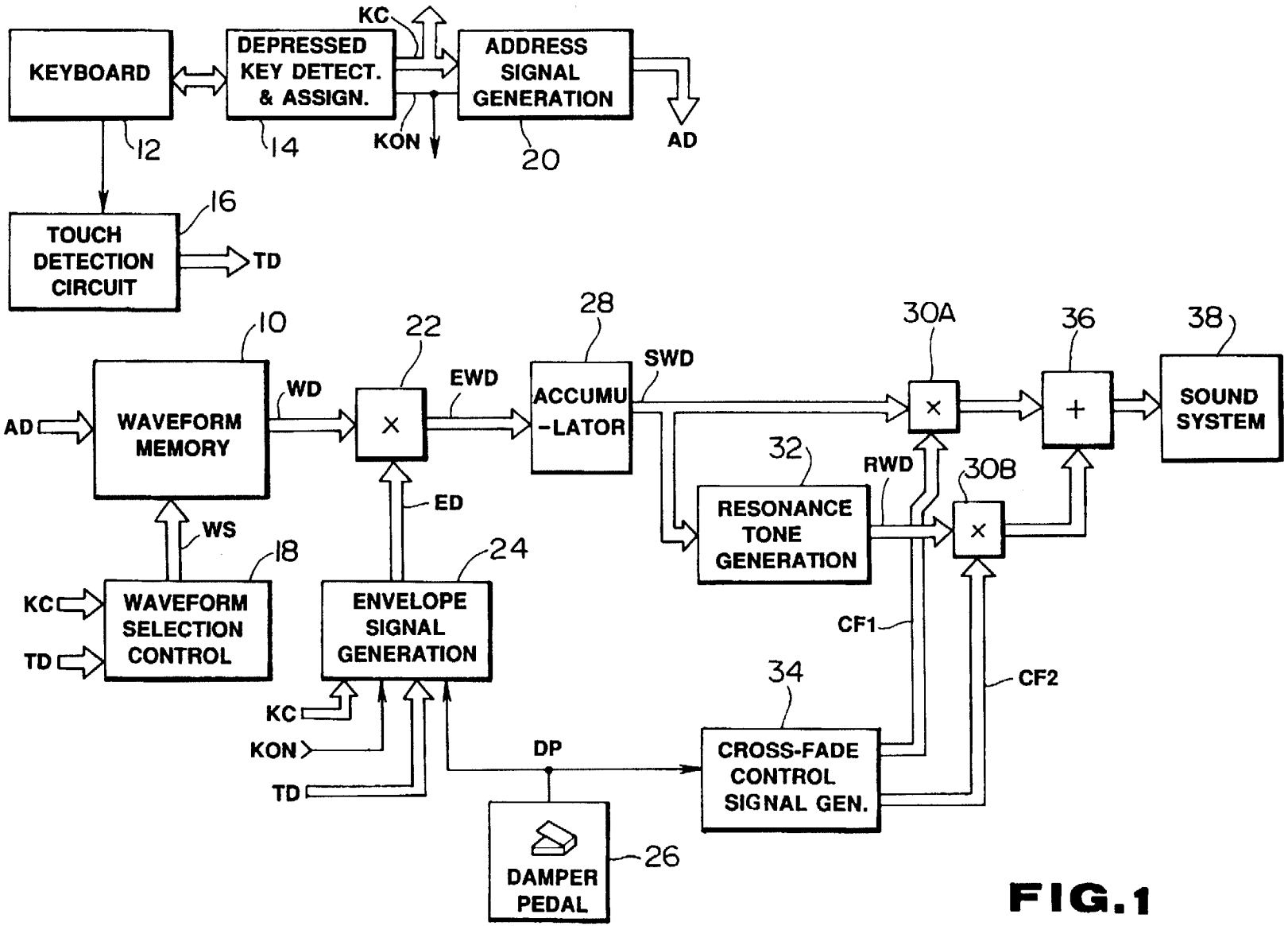
FIG. 1 is a block diagram showing a circuit construction of an electronic musical instrument incorporating the first embodiment of the invention.

Circuit Construction of the Electronic Musical Instrument (FIG. 1)

FIG. 1 shows a circuit construction of an electronic musical instrument incorporating a first embodiment of the invention. This electronic musical instrument is so constructed that it can produce plural tones simultaneously by a time division multiplexing processing in plural channels (e.g., eight channels).

Keys of a keyboard 12 are divided into plural groups each consisting of, e.g., keys of half octave (six keys) and waveform data for one key representing each group is stored in a waveform memory 10 with respect to respective levels of key touch stength in plural stages (e.g., three levels of "weak", "middle" and "strong"). The reason for storing waveform data for each key group is that a key scaling control can thereby be performed for producing different tone elements such as different tone colors depending upon the key group. The reason for storing waveform data for each key touch strength level is that a touch response control can thereby be performed for producing different tone color, tone volume or the like depending upon the key touch strength level.

Each waveform data stored in the waveform memory 10 is obtained, for example, by picking up a tone from a piano (as a natural musical instrument) being played in a damper pedal (i.e., loud pedal) OFF state, sampling its tone waveform at a predetermined time interval and converting amplitude values at respective sample points to digital data (i.e., PCM recording). In actual recording, piano keys are divided into groups in correspondence to key groups of the keyboard 12 of FIG. 1, one key representing each group is played at different touch levels of weak, middle and strong touches in a damper pedal OFF state to produce piano tones and waveform data for each tone is written in the waveform memory 10 by the PCM recording.

Figure 2:
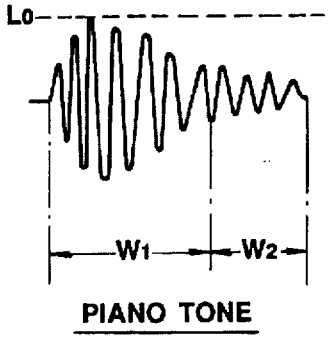
FIG. 2 is a waveform diagram showing an example of a piano tone waveform.

FIG. 2 shows an example of a waveform of a picked up piano tone. In the waveform memory 10, waveform data for a section W1+W2 from rising of the tone to some point of decay thereof for each tone is written, the portion of decay after W2 being discarded. In reading out waveform data from the waveform memory 10, the waveform data from W1 to W2 is read Out first and then the waveform data of W2 is repeatedly read out.

In storing data in the waveform memory 10, the amplitude level of each picked up tone wavefrom may be standardized to a constant level LO, e.g., maximum level, as shown in FIG. 2 and this standardized level may be stored in the waveform memory 10. By this arrangement, the amplitude value can be expressed digitally with high precision even in a low amplitude portion. Since an amplitude envelope is imparted by envelope imparting means 22 and 24 as will be described later, no adverse effect will be produced by adopting such arrangement.

A depressed key detection and key assigning circuit 14 detects a depressed key in the keyboard 12 and assigns key code data KC representing the key code (i.e., tone pitch) of the detected key and a key-on signal KON indicating that there is a depressed key to one of empty channels so that they are provided at the timing of this channel.

A touch detection circuit 16 detects which level among the weak, middle and strong levels the key touch strength of the depressed key in the keyboard 12 corresponds to and provides touch level data TD representing the detected touch level in synchronism with the timing of the channel to which the key code KC and the key-on signal KON have been assigned.

As described above, the circuits 14 and 16 are operated on a time shared basis and posterior circuits responsive to outputs of these circuits 14 and 16 are also operated on a time shared basis. For convenience of explanation, however, an operation for one channel only will be described below.

A waveform selection control circuit 18 generates waveform designation data WS in response to the key code data KC and the touch level data TD. In the waveform memory 10, a waveform to be read out is designated in response to the waveform desination data WS. If, for example, a key code represented by the key code data KC belongs to the first key group, waveform data corresponding to the touch level data TD among waveform data belonging to the first key group is designated for reading.

An address signal generation circuit 20 generates an address signal AD in response to the key code data KC and the key-on signal KON. The waveform data which has been designated by the waveform designation data WS is read out from the waveform memory 10 in response to the address signal AD. In this case, the designation of address by the address signal AD is performed at a speed corresponding to the key code (tone pitch) represented by the key code data KC and the tone pitch of the generated tone is determined in accordance with this reading speed. For plural keys belonging to the same key group, the same waveform data is read out at different reading speeds for respective keys so long as the keys are depressed at a constant key touch level.

The waveform data WD read out from the waveform memory 10 is supplied to a multiplier 22 in which it is multiplied with envelope shape data ED.

Figure 3:
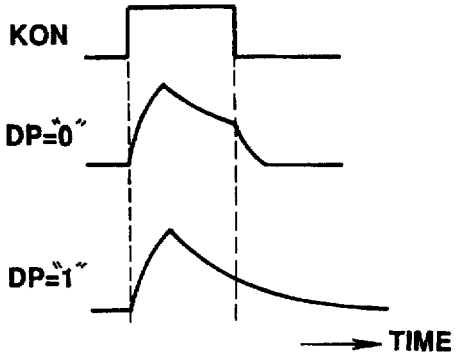
FIG. 3 is a signal waveform diagram for explaining the envelope shape generation operation.

An envelope signal generation circuit 24 generates envelope shape data ED in response to the key-on signal KON in such a manner that different envelope shapes are produced depending upon whether a damper pedal signal DP is "0" or "1" as shown in FIG. 3. The damper pedal signal DP is detected from a damper pedal 26 through a switch or the like means. When the damper pedal 26 is OFF and the signal DP="0", the envelope shape decays gradually after rising and decays rapidly after key-off. When the damper pedal 26 is ON and the signal DP="1", the envelope shape decays gradually even after key-off. Parameters such as attack time, attack level, decay time etc. of the envelope shape are controlled key group by key group in response to the key code data KC and also controlled touch level by touch level in response to the touch level data TD.

As a result of multiplication in the multiplier 22, waveform EWD imparted with an envelope shape in accordance with tone pitch, touch response and damper pedal state is provided and this waveform data EWD is supplied to an accumulator 28.

The accumulator 28 is provided for mixing waveform data for plural channels. Its output waveform data SWD is supplied to a multiplier 30A in which it is multiplied with a cross-fade control signal CF1. The waveform data SWD is supplied also to a resonance tone generation circuit 32 in which it is converted to resonance tone data RWD. The resonance tone data RWD from the resonance tone generation circuit 32 is supplied to a multiplier 30B in which it is multiplied with a cross-fade control signal CF2.

Figure 5:
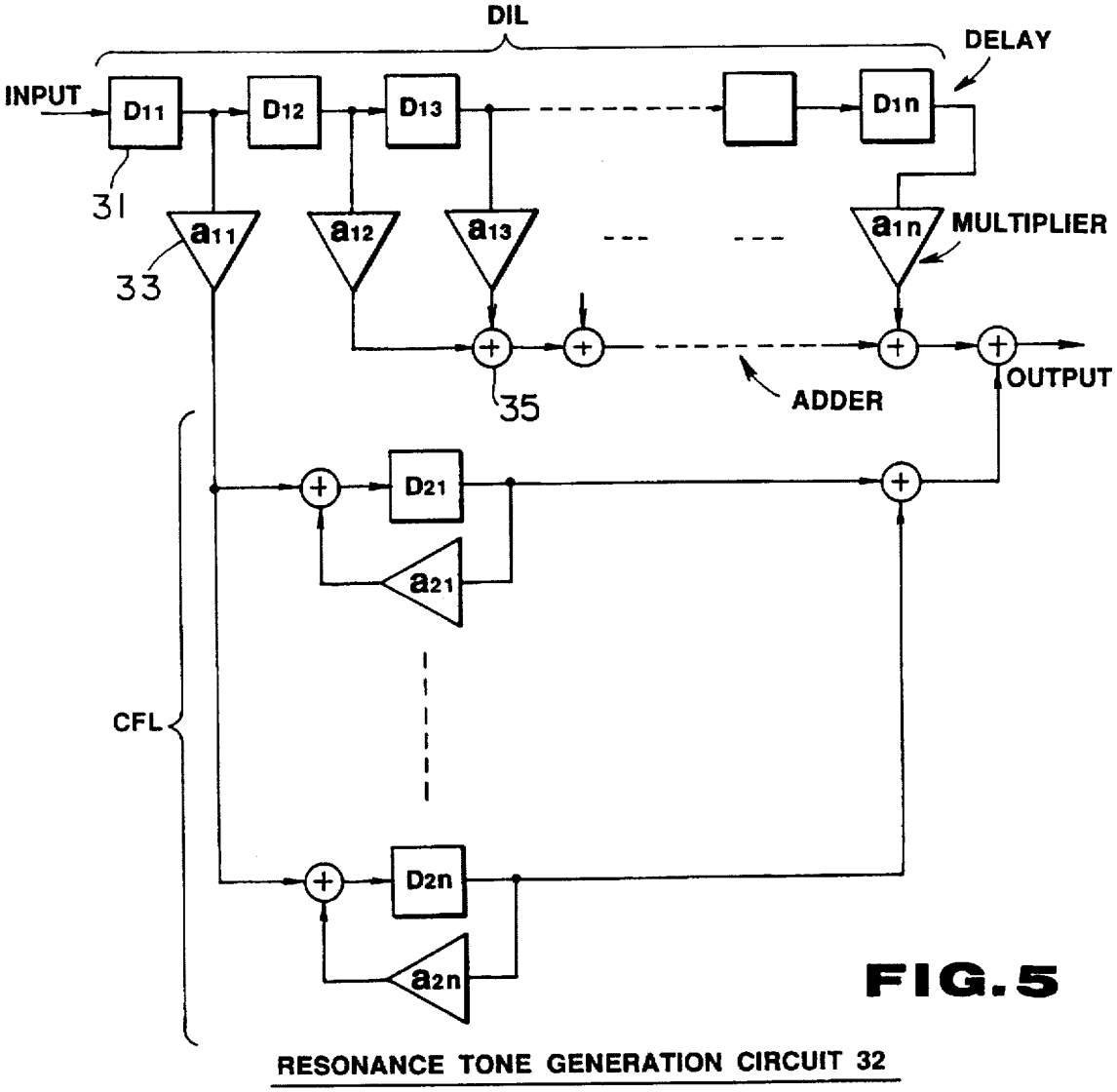
FIG. 5 is a circuit diagram showing an example of a resonance tone generation circuit.

The resonance tone generation circuit 32 is constructed, e.g., as shown in FIG. 5, of digital delay circuits 31 (shown by square blocks), coefficient multipliers 33 (shown by triangular blocks) and adders 35 (shown by circular blocks with "+" signs therein). By properly determining delay amounts D1l–D1n in a delay circuit group DIL receiving an input signal IN, coefficients a1l–a1n, delay amounts D2l–D2n in a comb-filter group CFL and coefficients a2l–a2n, a digital signal having a resonance or reverberation effect can be obtained as an output signal OUT. Accordingly, by inputting the waveform data SWD as the input signal IN, tone waveform data imparting an impression of expansion of a tone which is similar to a tone produced when a damper pedal is ON, i.e., resonance tone data, can be obtained as the output signal OUT.

Figure 4:
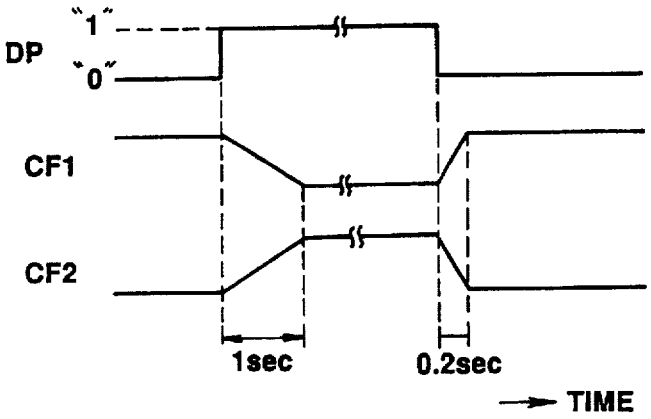
FIG. 4 is a signal waveform diagram for explaining the cross-fade control operation.

A cross-fade control signal generation circuit 34 generates the cross-fade control signals CF1 and CF2 in response to the damper pedal signal DP. An example of the cross-fade control signals is shown in FIG. 4. The cross-fade control signal CF1 is generated in such a manner that its level falls gradually from maximum value 1 to minumum value 0 taking about one second when the damper pedal signal DP has been turned from "0" to "1" (i.e., the damper pedal 26 has been turned ON from the OFF state), maintains the minimum value "0" as long as the signal DP maintains "1" and rises from the minimum value "0" to the maximum value "1" taking about 0.2 second when the signal DP has been turned from "1" to "0" (i.e., the damper pedal 26 has been turned OFF from the ON state). The cross-fade control signal CF2 is generated in the form of inverted cross-fade control signal CF1.

The above described arrangement in which the level changes more gradually when the damper pedal 26 is turned ON from the OFF state than when it is turned OFF from the ON state is convenient for simulating the increasing expansion of a tone due to resonance occurring when the damper has been released from all strings in playing a piano.

As a result of multiplications in the multipliers 30A and 30B, the waveform SWD is supplied to an adder 36 when the damper pedal 26 is OFF whereas the resonance tone data RWD is supplied to the adder 36 when the damper pedal 26 In this case, during the periods of about one second and about 0.2 second shown in FIG. 4, there is provided mixed data of the data SWD and RWD which are mixed in the adder 36 at a mixing ratio determined by the values of the cross-fade control signals CF1 and CF2.

The waveform data as the output of the adder 36 is supplied to a sound system 38 including a digital-to-analog converter, an amplifier and loudspeakers and is sounded therefrom as a tone.

Figure 6:
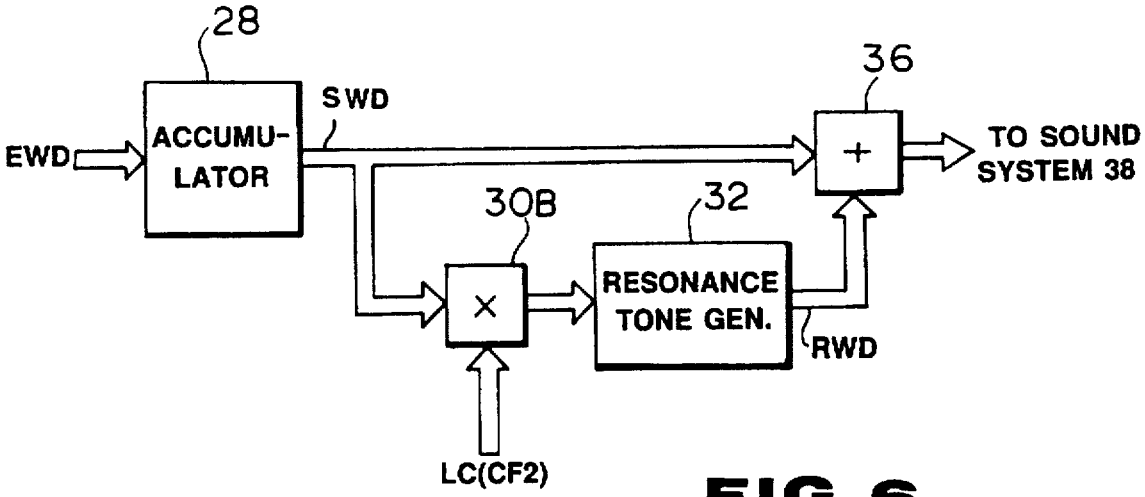
FIGS. 6 and 7 are block diagrams showing the second and third embodiments of the invention.

The Second Embodiment (FIG. 6)

FIG. 6 shows the second embodiment of the invention in which the resonance tone adding portion used in the circuit of FIG. 1 is modified. In FIG. 6, the same component parts as in FIG. 1 are designated by the same reference characters.

The second embodiment which is a modification of the embodiment of FIG. 1 is different from the embodiment of FIG. 1 in the following two points. Firstly, waveform data SWD from the accumulator 28 is supplied to the adder 36 without passing through the multiplier 30A. Secondly, the multiplier 30B is provided in a prior stage to the resonance tone generation circuit 32. In this case, a similar signal to the cross-fade control signal CF2 of FIG. 4 is supplied as a level control signal LC to the multiplier 30B.

In this construction, waveform data SWD is obtained as the output of the adder 36 when the damper pedal 28 is OFF. When the damper pedal 26 is ON, the waveform data SWD is supplied to the resonance tone generation circuit 32 through the multiplier 30B so that the resonance tone data RWD is provided from the circuit 32. Accordingly, mixed data of the waveform data SWD and the resonance tone data RWD is supplied as the output of the adder 36. In this case, during the periods of about one second and about 0.2 second shown in FIG. 4, the mixing ratio of the resonance tone data RWD to the waveform data SWD is controlled in response to the level control signal LC (corresponding to the cross-fade control signal CF2).

According to the construction of FIG. 6, when a desired key is depressed in the damper pedal ON state, waveform data which is a mixture of waveform data having the tone pitch corresponding to the depressed key and resonance tone data generated on the basis of this waveform data is obtained. This waveform data has a greater ratio of tone component of the depressed key than in a case where, as shown in FIG. 1, resonance tone data alone is provided so that this construction is advantageous when it is desired to emphasize the tone of a depressed key. The multiplier 30B may be provided in a posterior stage to the resonance tone generation circuit 32.

Figure 7:
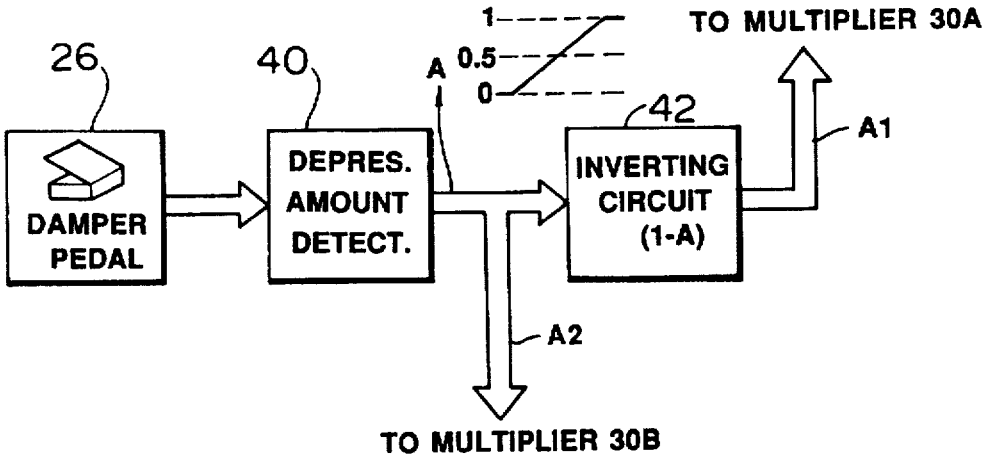

The Third Embodiment (FIG. 7)

FIG. 7 shows the third embodiment of the invention in which the mixing ratio control portion used in the circuit of FIG. 1 is modified. The same component parts as in FIG. 1 are designated by the same reference characters.

A feature of this embodiment is that a depression amount detection circuit 40 for detecting an amount of depression of the damper pedal 26 is provided and a detection output A of this detection circuit 40 is supplied to the multiplier 30B as a signal A2 instead of the cross-fade control signal CF2 while a signal A1 obtained by inverting the detection output A by an inverting circuit 42 (i.e., "1–A") is supplied to the multiplier 30A instead of the cross-fade control signal CF1.

According to this construction, in the process of increasing of the value of the detection output A from the minimum value 0 to the maximum value 1 by depression of the damper pedal 26, the waveform data SWD from the accumulator 28 is controlled by the multiplier 30A to decrease in its amplitude level while the resonance tone data RWD from the resonance tone generation circuit 32 is controlled by the multiplier 30B to increase in its amplitude level. Thus, the adder 36 provides waveform data which is a mixture of the data SWD and RWD at a mixing ratio determined by the values of the signals A1 and A2. If the damper pedal 26 is not depressed, the adder 36 provides the waveform data SWD and, if the damper pedal 26 is depressed most deeply, the adder 36 provides the resonance tone data RWD.

According to the construction of FIG. 7, the performer can set the mixing ratio of the waveform data SWD and the resonance tone data RWD as desired by properly adjusting the amount of depression of the damper pedal 26 whereby a tone color change can be obtained in addition to the damper pedal ON/OFF effect as described with reference to FIG. 1.

Figure 8:
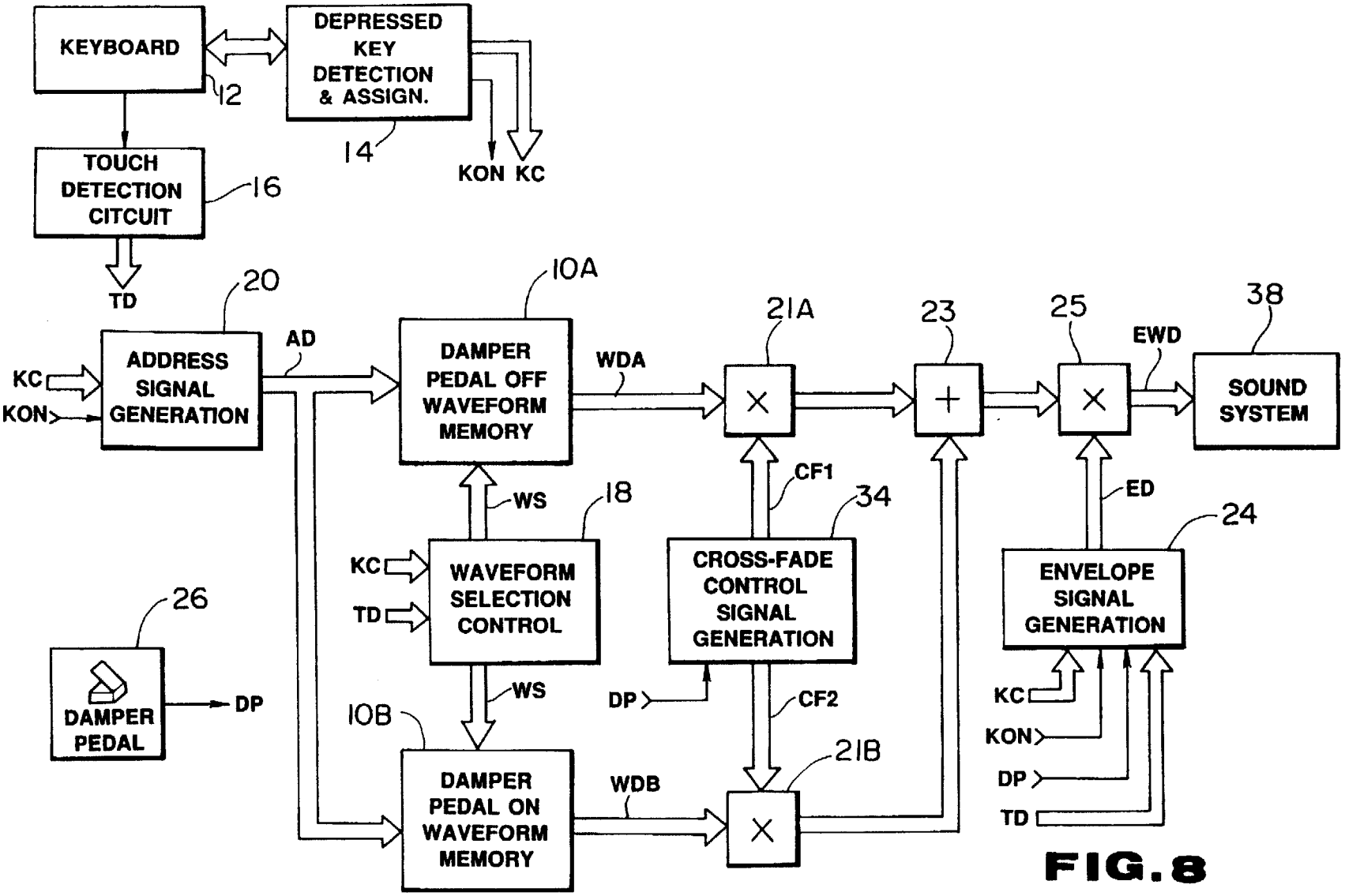
FIG. 8 is a block diagram showing a circuit construction of an electronic musical instrument incorporating another embodiment of the invention.

Circuit Construction of Electronic Musical Instrument of Another Embodiment (FIG. 8)

FIG. 8 shows a circuit construction of another embodiment of the electronic musical instrument according to the invention. In the same manner as in the above described embodiment, this electronic musical instrument can produce plural tones simultaneously by a time division multiplexing processing in plural channels (e.g., eight channels). In FIG. 8, the same component parts as in FIG. 1 are designated by the same reference characters.

A damper pedal OFF waveform memory 10A is of a similar construction to the waveform memory 10 in FIG. 1, storing waveform data for each key group in a damper pedal OFF state with respect to each of plural stages of touch levels.

A damper pedal ON waveform memory 10B stores waveform data sampled from a piano as a natural musical instrument for each key group with respect to each of plural stages of touch levels in the same manner as in the waveform memory 10A except that the damper pedal is not in an OFF state but in an ON state. Since a key has been depressed in the damper pedal ON state in this case, each waveform data represents a mixed waveform of a tone produced by vibration of a string corresponding to the depressed key and tones produced by vibration of other strings due to resonance.

In the same manner as in the above described embodiment, in the waveform memories 10A and 10B, a waveform to be read out is designed in response to waveform designation data WS from the waveform selection control circuit 18.

In the same manner as in the above described embodiment, waveform data designated by the waveform designation data WS are read out in parallel from the waveform memories 10A and 10B in response to the address signal AD from the address generation circuit 20.

The waveform data WD read out from the waveform memory 10A is supplied to a multiplier 21A in which it is multiplied with the cross-fade control signal CF1. The waveform data WDB read out from the waveform memory 10B is supplied to a multiplier 21B in which it is multiplied with the cross-fade control signal CF2.

The cross-fade control signals CF1 and CF2 are, in the same manner as in the above described embodiment, generated by the cross-fade control signal generation circuit 34. An example of these cross-fade control signals are shown in FIG. 4.

As a result of multiplications in the multipliers 21A and 21b, the waveform data WDA is supplied to the adder 23 when the damper pedal 26 is OFF and the waveform data WDB is supplied to the adder 23 when the damper pedal 26 is ON. In this case, during the periods of about one second and about 0.2 second shown in FIG. 4, a mixture of the waveform data WDA and WDB which are mixed together by the adder 23 at a mixing ratio determined by values of the cross-fade control signals CF1 and CF2.

The waveform data as the output of the adder 23 is supplied to a multiplier 25 in which it is multiplied with the envelope shape data ED which is generated from the envelope shape generation circuit 24 as shown in FIG. 3.

As a result of the multiplication in the multiplier 25, waveform data EWD which has been imparted with envelope in accordance with tone pitch, touch level and damper pedal state is obtained. This waveform data EWD is supplied to the sound system 38.

In the embodiment of FIG. 8 also, the construction of the mixing ratio control portion can be modified as shown in FIG. 7. In this case, the output A2 of the depression amount detection circuit 40 is applied to the multiplier 21B instead of the cross-fade control signal CF2 and the output A1 of the inversion circuit 42 is applied to the multiplier 21A instead of the cross-fade control signals CF1. By this arrangement, in the same manner as in the above described embodiment, the performer can set the mixing ratio of the waveform data WDB including resonance tone to the waveform data WDA as desired by properly adjusting the amount of depression of the damper pedal 26 whereby a tone color change according to the mixing ratio can be obtained in addition to the damper pedal ON/OFF effect shown in FIG. 8.

Modifications

The present invention is not limited to the above described embodiments but can be carried out in various other forms. For example, the following modifications are possible:

(1) As to storing and reading of tone waveforms, as shown in US-P 4,633,749, a waveform of plural periods of attack portion and subsequent several segment waveforms (partial waveforms) may be stored in a memory and the waveform of plural periods of the attack portion may be read out and then the segment waveforms may be read out, performing a smooth interpolation between them.

(2) As to recording and reproducing of a tone, a system by which data compression is possible may be employed. Such system includes, for example, a differential pulse code modulation (DPCM) system, an adaptive differential pulse code modulation (ADPCM) system, a delta modulation (DM) system, an adaptive delta modulation (ADM) system, a linear predictive coding (LPC) system or a combination of these systems (e.g. combination of LPC and ADPCM).

(3) As to controlling of touch response and key scaling, a system of processing data read out from a waveform memory by a digital filter as disclosed by US-P 4,738,179 or a system of controlling a mixing ratio of data read out from two waveform memories as disclosed by Japanese Preliminary Patent Publication No. 60-55398, for example, may be employed.

(4) In the above described embodiments, waveform data designated by the waveform selection control circuit 18 is read out in response to the address signal from the address generation circuit 20. Alternatively, the function of the waveform selection control circuit 18 may be provided to the address signal generation circuit (5) This invention is applicable also to a monophonic electronic musical instrument.

(6) In the above described embodiments, a piano tone is employed. The invention is applicable also to other tone colors.

(7) In the embodiment of FIG. 1, read out waveform data for plural channels are mixed by the accumulator 28 and thereafter are supplied to the resonance tone generation circuit 32. Alternatively, a resonance tone generation circuit may be provided independently for each channel and read out waveform data of a corresponding channel may be supplied to each resonance tone generation circuit. In this case, in each resonance tone generation circuit, it is preferable to properly control internal connection, coefficients etc. in accordance with the tone pitch.

(8) the cross-fade control as shown in the embodiment of FIG. 1 may be omitted and the read out waveform data and the resonance tone data may be simply switched.

(9) In the embodiment of FIG. 1, tone signals of two systems consisting of the read oui waveform data and the resonance tone data may be supplied to separate sound systems and sounded after being mixed in space instead of being sounded from a single sound system after mixing.

(10) In the embodiment of FIG. 8, in reading out the designated waveform data from the waveform memories 10A and 10B, these data may be read out on a time shared basis instead of being read out in parallel.

(11) The cross-fade control as shown in the embodiment of FIG. 8 may be omitted. In this case, the waveform memory 10A or 10B may be selected in response to the damper pedal signal DP and waveform data may be read out from the selected waveform memory.

(12) In the embodiment of FIG. 8, tone signals of two systems based on read out data from the waveform memories 10A and 10B may be supplied to separate sound systems and sounded after being mixed in space instead of being sounded from a single sound system after being mixed.

According to the invention, a desired tone or a resonance tone corresponding to this tone can be generated as desired and, accordingly, simulation of a damper pedal effect as in a piano can be achieved with high fidelity.

By performing the cross-fade control so that the amplitude level of resonance tone data increases gradually from start of operation of the operator as shown in the embodiment of FIG. 1 or FIGS. 6 and 8, a closer simulation of the damper pedal effect can be realized By controlling the mixing ratio of tone signals of two systems in accordance with the operation amount of the operator as shown in the embodiment of FIG. 7, the feeling of expansion of a tone can be controlled as desired.

What is claimed is:

[1. A tone signal generation device comprising:

memory means for storing waveform information corresponding to a desired tone waveform;

readout means for reading out the waveform information from the memory means at a desired readout speed in response to externally provided note selection information;

resonance tone generation means for generating resonance tone information in accordance with the read out output of the waveform information;

an operator, operable independently of note selection;

detection means for detecting the presence or absence of operation of said operator and delivering out a detection output exhibiting a different value depending upon presence or absence of operation of said operator; and output means for delivering out the read out output of the waveform information as a first tone signal when the detection output exhibits one value and delivering out the resonance tone information as a second tone signal when the detection output exhibits another value.]

2. [A tone signal generation device as defined in claim 1] *A tone signal generation device comprising:*

*memory means for storing waveform information corresponding to a desired tone waveform;*

*readout means for reading out the waveform information from the memory means at a desired readout speed in response to externally provided note selection information;*

*resonance tone generation means for generating resonance tone information in accordance with the read out output of the waveform information;*

*an operator, operable independently of note selection, which is movable from a normally unoperated state to an operated state and returns to the unoperated state upon release thereof;*

*detection means for detecting the presence or absence of operation of said operator and delivering out a detection output exhibiting a different value depending upon presence or absence of operation of said operator; and*

*output means for delivering out the read out output of the waveform information as a first tone signal when the detection output exhibits one value and delivering out the resonance tone information as a second tone signal when the detection output exhibits another value,* wherein the one value and the other value exhibited by the detection output correspond respectively to the presence and absence of operation of said operator and said output means gradually increases the amplitude level of the resonance tone information from the start of operation of said operator.

[3. A tone signal generation device comprising:

memory means for storing waveform information corresponding to a desired tone waveform;

readout means for reading out the waveform information from the memory means at a desired readout speed in response to externally provided note selection information;

resonance tone generation means for generating resonance tone information in accordance with the read out output of the waveform information;

an operator, operable independently of note selection;

detection means for detecting an amount of operation of this operator and delivering out a detection output corresponding to the amount of operation;

first level control means for controlling the level of the read out output of the waveform information in one direction in accordance with increase in the amount of operation exhibited by the detection output; and second level control means for controlling the amplitude level of the resonance tone information in a direction which is opposite to said one direction in accordance with increase in the amount of operation exhibited by the detection output, the outputs of said first and second level control means being delivered out as a first tone signal and a second tone signal, respectively.]

[4. A tone signal generation device comprising:

memory means for storing first waveform information corresponding to a waveform of a desired tone and second waveform information corresponding to a mixed waveform of said tone and a resonance tone thereof;

an operator, operable independently of note selection;

detection means for detecting the presence or absence of operation of said operator and delivering out a detection output exhibiting a different value depending upon presence or absence of operation of said operator; and tone signal generation means for generating a first tone signal in accordance with the first waveform information when the detection output exhibits one value and a second tone signal in accordance with the second waveform information when the detection output exhibits another value.]

5. [A tone signal generation device as defined in claim 4 wheein] *A tone signal generation device comprising:*

*memory means for storing first waveform information corresponding to a waveform of a desired tone and second waveform information corresponding to a mixed waveform of said tone and a resonance tone thereof;*

*an operator, operable independently of note selection, which is moveable from a normally unoperated state to an operated state and returns to the unoperated state upon release thereof;*

*detection means for detecting the presence or absence of operation of said operator and delivering out a detection output exhibiting a different value depending upon presence or absence of operation of said operator; and*

*tone signal generation means for generating a first tone signal in accordance with the first waveform information when the detection output exhibits one value and a second tone signal in accordance with the second waveform information when the detection output exhibits another value, wherein* said tone signal generation means comprises:

readout means for reading out the first waveform information and the second waveform information in parallel from said memory means at a desired speed; and selection means for selecting the read out output of the first waveform information and delivering it out as the first tone signal when the detection output exhibits a value corresponding to absence of operation of said operator and selecting the read out output of the second waveform information and delivering it out as the second tone signal when the detection output exhibits a value corresponding to presence of operation of said operator, said selection means gradually decreasing the level of the read out output of the first waveform information from start of operation of said operator while gradually increasing the level of the read out output of the second waveform information.

[6. A tone signal generation device comprising:

memory means for storing first waveform information corresponding to a waveform of a desired tone and second waveform information corresponding to a mixed waveform of the tone and a resonance tone thereof;

readout means for reading out the first and second waveform information from the memory means at a desired speed in response to externally provided note selection information;

an operator, operable independently of note selection;

detection means for detecting an amount of operation of this operator and delivering out a detection output corresponding to the amount of operation;

first level control means for controlling the level of the read out output of the first waveform information and for changing it in one direction in accordance with an increase in the amount of operation exhibited by the detection output; and second level control means for controlling the level of the read out output of the second waveform information and for changing it in a direction which is opposite to said one direction in accordance with an increase in the amount of operation exhibited by the detection output, the outputs of said first and second level control means being delivered out as a first tone signal and a second tone signal, respectively.]

7. An electronic musical instrument comprising:

tone pitch designation means for designating a tone pitch of a tone to be generated;

tone signal generation means for generating a tone signal in accordance with the tone pitch designated by said tone pitch designation means;

an operator for controlling a tone, operable independently of note selection, *which is movable from a normally unoperated state to an operated state and returns to the unoperated state upon release thereof*;

resonance tone adding means responsive to operation of said operator for adding a resonance tone to the tone signal to be generated by said tone signal generation means; and envelope changing means, for changing the shape of an amplitude envelope of the tone signal generated by said tone signal generation means in response to the operation of said operator.

8. An electronic musical instrument as defined in calim 7 wherein said tone signal generation means comprises memory means for storing waveform information for a desired tone waveform and delivering out the waveform information in accordance with the tone pitch designated by said tone pitch designation means and generates a tone signal in accordance with the read out waveform information and said resonance tone adding means comprises resonance tone generation means for generating a resonance tone signal on the basis of the waveform information read out from said memory means so that the resonance tone signal is at least included in the tone signal generated by said tone signal generation means when said operator is operated.

9. An electronic musical instrument as defined in claim 8 wherein said resonance tone adding means further comprises mixing means for mixing the resonance tone signal with a tone waveform signal corresponding to the waveform information read out from said memory means.

10. An electronic musical instrument as defined in claim 9 wherein said mixing means timewise changes, within a predetermined time length when said operator is operated, a ratio of mixing of the resonance tone signal and the tone waveform signal corresponding to the waveform information read out from said memory means so that the ratio of the resonance signal gradually increases whereas the ratio of the tone waveform signal gradually decreases.

11. An electronic musical instrument as defined in claim 10 wherein said mixing means timewise changes, within a predetermined time length when operation of said operator has ceased, a ratio of mixing of the resonance tone signal and the tone waveform signal corresponding to the waveform information read out form said memory means so that the ratio of the resonance tone signal gradually decreases whereas the tone waveform signal gradually increases.

12. An electronic musical instrument as defined in claim 9 which further comprises means for detecting an amount of operation of said operator *within the operated state* and wherein said mixing means determines the mixing ratio of the resonance tone signal and the tone waveform signal corresponding to the waveform information read out from said memory means in accordance with the detected amount of operation of said operator.

13. An electronic musical instrument as defined in claim 8 wherein, when said operator is operated, the resonance tone signal generated by said resonance tone generation means is delivered as the tone signal from said tone signal generation means.

14. An elecronic musical instrument as defined in claim 8 wherein said resonance tone generation means comprises a filter.

15. An electronic musical instrument as defined in claim 7 wherein said tone signal generation means comprises memory means for storing first waveform information corresponding to a desired tone waveform and second waveform information corresponding to a waveform having characteristics of a resonance tone for the tone waveform, reads out at least one of the first waveform information and the second waveform information in accordance with the tone pitch designated by said tone pitch designation means, and generates a tone signal in accordance with the read out waveform information, and said resonance tone adding means causes the tone signal to be generated in accordance with the first waveform information in said tone signal generation means when said operator is not operated and causes the tone signal to be generated in accordance with at least the second waveform information in said tone signal generation means when said operator is operated.

16. An electronic musical instrument as defined in claim 15 wherein said resonance tone adding means causes the tone signal to be generated by mixing a signal based on the first waveform information and a signal based on the second waveform information.

17. An electronic musical instrument as defined in claim 16 wherein said resonance tone adding means timewise changes, within a predetermined time length when said operator is operated, the mixing ratio of the signals based on the first and second waveform information so that the ratio of the signal based on the second waveform information gradually increases and the ratio of the signal based on the first waveform information gradually decreases.

18. An electronic musical instrument as defined in claim 17 wherein said resonance tone adding means timewise changes, within a predetermined time length when the operation of said operator has ceased, the mixing ratio of the signals based on the first and second waveform information so that the ratio of the signal based on the second waveform information gradually decreases and the ratio of the signal based on the first waveform information gradually increases.

19. An electronic musical instrument as defined in claim 16 which further comprises means for detecting an amount of operation of said operator *within the operated state* and wherein said resonance tone adding means determines the mixing ratio of the signal based on the first waveform information and the second waveform information in accordance with the detected amount of operation of said operator.

20. An electronic musical instrument as defined in claim 15 wherein said resonance tone adding means causes the signal corresponding to the second waveform information to be generated as the tone signal from said tone signal generation means when said operator is operated.

21. An electronic musical instrument as defined in claim 7 wherein said envelope changing means changes the decay rate of an amplitude envelope of the tone signal to be generated in said tone signal generation means.

[22. A tone signal generation device for simulating the tone color characteristics of a piano of the type having a damper pedal, comprising:

memory means for storing waveform information corresponding to a tone waveform having piano type tone color characteristics;

readout means for reading out the waveform information from the memory means at a desired readout rate;

a switching mechanism;

means, responsive to operation of said switching mechanism, for modifying the read out tone waveform information so as to simulate the resonance effect of operation of a damper pedal in a piano; and output means for delivering the read out waveform information or the modified waveform information based on the operation of said switching mechanism.]

*23. A musical tone control system for controlling a musical tone generated from a tone generator means, comprising:*

*a pedal means which is movable from a normally unoperated state to an operated state and returns to the unoperated state upon release thereof, and which is operable for designating addition of an envelope and an effect to said musical tone;*

*operated-amount signal generator means, coupled to said pedal means, for detecting an operated amount of said pedal means and for generating an operated-amount signal;*

*system control means, coupled to said operated-amount signal generator means, for outputting an envelope-control signal and for also outputting an effect control signal for changing a parameter in accordance with said operated-amount signal;*

*envelope control means, coupled to said tone generator means and to said system control means, for controlling an envelope of said musical tone which is generated from said tone generator means, in accordance with said envelope-control signal output from said system control means; and*

*effect adding means, coupled to said tone generator means and to said system control means, for adding said effect to said musical tone in accordance with said parameter which is changed by said effect control signal which is output from said system control means, said parameter thereby controlling the addition of said effect to said musical tone as a function of the operated amount of said pedal means.*

*24. The musical tone control system of claim 23 wherein said system control means includes an envelope signal generation circuit for receiving the operated-amount signal and outputting said envelope-control signal and an effect signal generating circuit for receiving the operated-amount signal and outputting said effect control signal.*

*25. The musical tone control system of claim 23, wherein said pedal means comprises a damper pedal.*

*26. The musical tone control system of claim 23, wherein said operated-amount signal generator means includes means for detecting two ON/OFF statuses of said pedal means as the operated amount of said pedal means.*

*27. The musical tone control system of claim 23, wherein said operated-amount signal generator means includes means for detecting at least two statuses of said pedal means within the operated state as the operated amount of said pedal means.*

*28. The musical tone control system of claim 23, wherein said effect adding means includes reverberation effect adding means.*

*29. The musical tone control system of claim 28, wherein said reverberation effect adding means includes means for generating parameters for determining a reverberation depth in accordance with said effect control signal output from said system control means.*

* * * * *